United States Patent [19]

Gannon

[11] Patent Number: 4,798,324
[45] Date of Patent: Jan. 17, 1989

[54] VALVE AND CONTAINERS INCORPORATING THE SAME

[75] Inventor: Raymond Gannon, Farnborough, United Kingdom

[73] Assignee: FGL Projects Limited, London, United Kingdom

[21] Appl. No.: 82,079

[22] Filed: Aug. 5, 1987

[30] Foreign Application Priority Data

Aug. 5, 1986 [GB] United Kingdom ............... 8619126

[51] Int. Cl.⁴ .............................................. B65D 5/42
[52] U.S. Cl. ............................ 229/125.35; 220/209; 222/498; 222/541; 229/103.1; 229/DIG. 14; 264/248; 264/322
[58] Field of Search ...................... 220/209; 383/44; 206/620; 229/125.35, DIG. 14, 103.1; 222/107, 541, 212, 213, 215, 498; 251/75, 331, 342; 264/248, 249, 322

[56] References Cited

U.S. PATENT DOCUMENTS

| | | | |
|---|---|---|---|
| 3,184,121 | 5/1965 | Volckening | 222/541 |
| 3,243,487 | 3/1966 | Smith | 264/248 |
| 3,482,267 | 12/1969 | Liljendahl | 251/331 |
| 3,631,580 | 1/1972 | Swartz | 264/322 |
| 3,635,376 | 1/1972 | Hellstrom | 206/620 |
| 3,815,794 | 6/1974 | Carlisle | 222/491 |
| 3,935,358 | 1/1976 | Wyeth et al. | 264/248 |
| 4,008,029 | 2/1977 | Shokite | 264/322 |
| 4,039,643 | 8/1977 | Dean et al. | 264/248 |
| 4,206,870 | 6/1980 | DeVries | 220/209 |
| 4,301,926 | 11/1981 | Chung | 206/620 |
| 4,592,493 | 6/1986 | Smith | 222/212 |

Primary Examiner—Stephen Marcus
Assistant Examiner—Gary E. Elkins
Attorney, Agent, or Firm—Bert J. Lewen; Henry Sternberg

[57] ABSTRACT

A valve for use primarily for dispensing liquids from non-reusable containers comprising a conduit formed by bonding a flexible sheet of thermoplastic material to a second sheet of resilient thermoplastics material. The second sheet is of a springy nature and is provided with a shoulder portion directed to the first sheet. The shoulder portion is positioned adjacent to a deformable member formed into the second sheet. The conduit is closed by the first sheet being stretched tightly over the shoulder. However by deforming the deformable member towards the first sheet the latter is raised from the shoulder thereby opening the conduit.

16 Claims, 3 Drawing Sheets

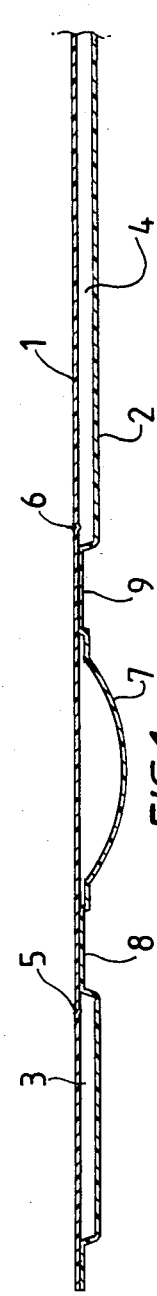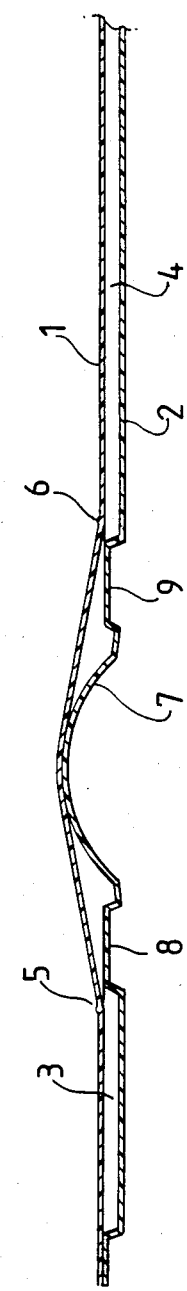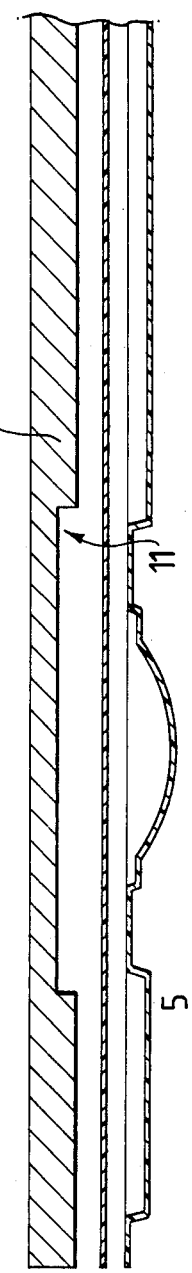

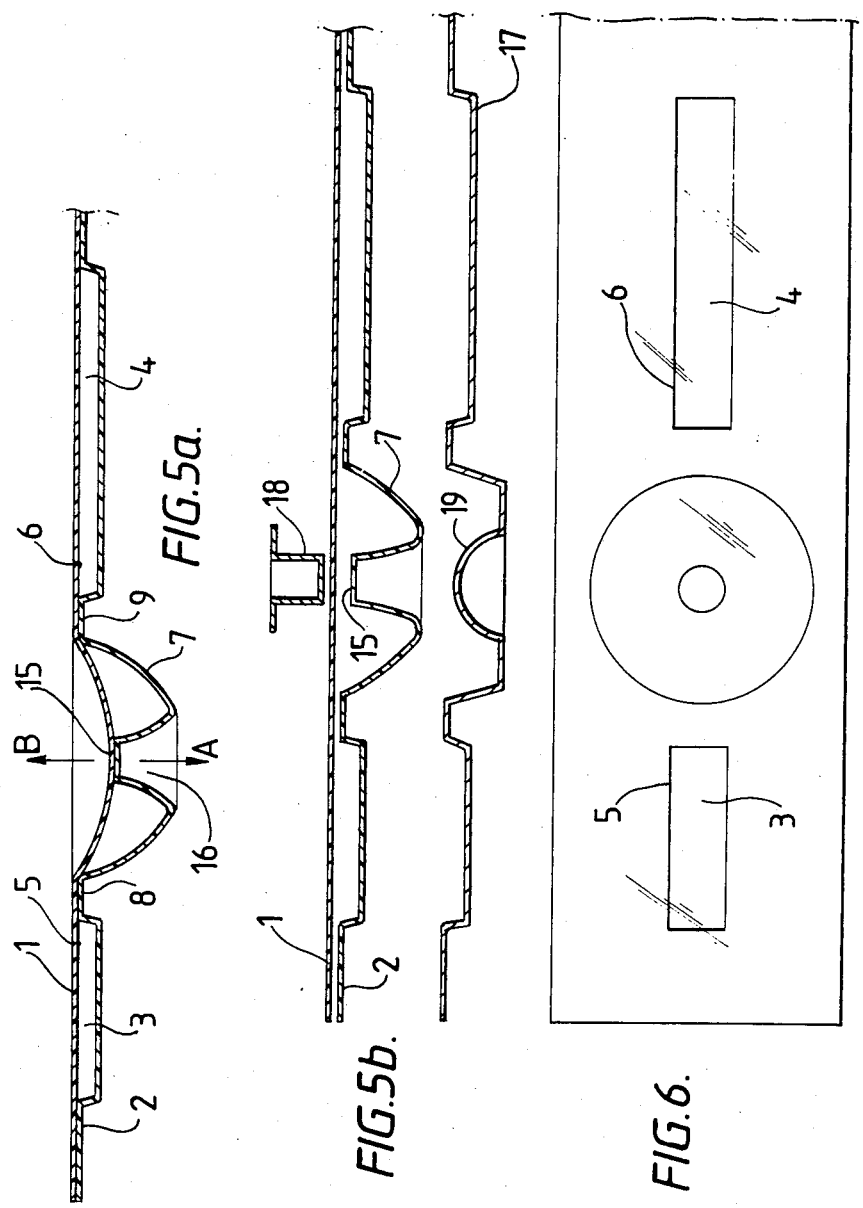

VALVE AND CONTAINERS INCORPORATING THE SAME

This invention relates to a new valve and to containers incorporating the same.

Liquids, for example, alcoholic and non-alcoholic beverages, are being sold in increasingly large quantities either in bags or cartons having walls which are semi-rigid and made of flexible plastics materials, or in containers made of other materials, for example cardboard and, incorporating a plastics bag liner. When the containers are large, the need frequently arises for a closure which can be operated as a valve so that the contents of the container can be abstracted in portions. The container can then be sealed after each portion has been withdrawn. When the containers are large, stop-cocks of varying degrees of complexity are employed to enable the container to be opened and shut repeatedly. However such valves are too expensive and too complicated when the containers are smaller and are of the type which are discarded after a single use.

Accordingly, this invention is directed to a valve which is inexpensive and which can be made easily.

Accordingly, this invention provides a valve comprising a conduit, formed by bonding a first sheet of flexible material to a second sheet of resilient material, one of the sheets being provided with a shoulder extending towards the other sheet, the conduit being closed by the shoulder and the other sheet being in close intimate contact, and means to separate the shoulder and the other sheet and thereby to open the conduit.

The first sheet comprises a flexible film of thermoplastics material having a thickness preferably within the range of from 50 to 200 microns and more particularly from 90 to 95 microns. The second sheet is thicker and preferably has a thickness of from 400 to 600 microns and particularly about 500 microns. It should not only be flexible but in addition when appropriately shaped it should display the resiliency of a spring. The materials forming the sheets can be the same or different and a sheet can comprise a laminate of more than one material which can include by way of example polyesters and polyvinyl chloride coated with polyethylene.

The valves can be incorporated at little additional cost with a wide variety of plastics containers used in the packaging of food, electrical components and other goods. Such containers often comprise a plastics box or tray having a wall thickness and flexural properties which enables it, by appropriate adaption, to consitute the second sheet forming part of the valve whilst the filmic materials employed generally as lidding materials for closing the container can constitute the first sheet of the valve. The incorporation of the valve with the container can be achieved readily by modifying the mould used for converting a sheet of plastics material into a container so that when the container is being made it is provided simultaneously with a flange shaped to form part of the valve. The other part of the valve can also be formed simultaneously when the container is lidded with a film of flexible material utilising a conventional lidding machine although for certain forms of valve constructions the machine may require minor alteration.

This invention is illustrated but not restricted by the following drawings in which FIG. 1 is a side view taken in vertical section showing one form of invention valve in a closed position.

FIG. 2 is a side view taken in vertical section of the valve shown in FIG. 1 in an open position.

FIG. 3 is a side view taken in vertical section showing schematically one of the stages in the manufacture of the valve.

FIGS. 5a and 5b show schematically in vertical section some of the stages in the manufacture of another form of valve.

FIG. 6 is a plan view of the valve shown in FIGS. 5a and 5b.

Figure 4:
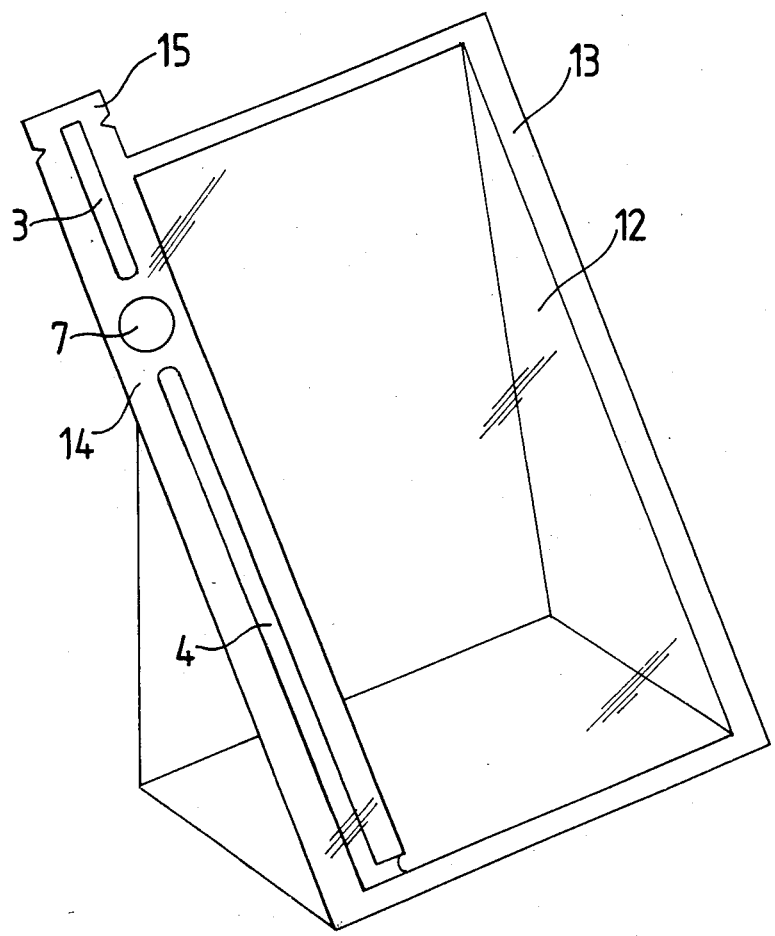
FIG. 4 is a view in perspective of a container incorporating the valve shown in the previous drawings.

In the FIGS. 1 to 3 a flexible sheet (1) made of polyethylene and having a thickness of 90 microns is bonded to a thicker sheet (2) made of polyethylene laminated to a polyamide and having a thickness of 500 microns. Sheet (1) is readily deformable whilst sheet (2) is semi-rigid and displays some spring-like quanlities when bent. Located between the sheets are two conduits (3 and 4) formed by a depression in sheet (2) covered by sheet (1). The two sheets are not bonded between positions (5 and 6). In FIG. 1 a part of sheet (2) is provided with a deformable member (7) which is in the form of a hollow rounded protuberance which extends away from the plane of the bonded sheets (1 and 2). When members (7) is in the position shown in this figure the unbonded part of sheet (1) extending between positions (5 and 6) is stretched tightly against shouldered portions (8 and 9) of sheet (2). As a consequence communication between conduits (3 and 4) is prevented. However, if member (7) is pressed towards the plane of the bonded sheets the valve is opened because the unbonded length of sheet (1) is lifted off shoulders (8 and 9) and communication between conduits (3 and 4) is established around the base of deforming member (7). The communication when established can be permanent or temporary depending upon the construction of member (7). Thus because of the resilient nature of sheet (2) if the deforming pressure is released member (7) returns immediately to the position shown in FIG. 1 and communication between the two conduits becomes blocked, i.e. the valve is closed. However if member (7) is constructed so that a little S or Z shaped twist is formed into the wall of the member, once the member has been deformed in the direction shown in FIG. 2 it will remain in that position indefinitely in which case the valve remains open. However a valve of this construction can be closed by application of pressure to the top of the member so as to cause it to revert to the position shown in FIG. 1.

The present valves can be made very readily. Thus sheet (2) can be shaped by subjection of a flat sheet to heat and pressure in a press provided with a mould having a shape corresponding to the deformable member (7) and conduits (3 and 4). When sheet (2) has been shaped it is then plied with sheet (1) and heated in a press shown in FIG. 3 having a mould (10) with a cut out portion (11) the length of which corresponds to the distance between positions (5 and 6).

The cheapness and simplicity of the present valves enables them to be used as closures for a wide range of disposable containers an example of which is shown in FIG. 4.

FIG. 4 shows in perspective a container (12) for beverages for example fruit juices, wine and the like. The container is made of synthetic plastics material and is in the shape of a prism to facilitate packing and transport although for the purposes of the present invention the container can have any shape.

The container is provided with a flange (13) which is enlarged on one side (14) to accommodate a valve according to the present invention. The main body of the container can be made of the same semi-rigid resilient plastics sheet material as sheet (2) in the previous figures whilst the front panel of the container can be made of the same material as sheet (1). Conduit (3) terminates at one end in a permanent closure (15) which is removed by cutting when liquid in the container is to be withdrawn. When deforming member (7) is pressed communication between conduit (3) and conduit (4) is established. The combined effect of conduit (3) and (4) is to provide a straw or tube through which liquid can be obtained from the container by application of suction to the opened end of conduit (3). When a proportion of the liquid has been withdrawn pressure on member (7) is released and as a result the valve closes automatically and seals the container.

The ability of the valve shown in FIG. 4 to resist leaking is dependent to a major extent on the tightness with which sheet (1) is stretched over shoulder portions (8 and 9). The valve depicted prevents spillage of the contents once the container has been opened by removal of the permanent closure (15). However if a higher resistance to leakage is required the valve depicted in FIG. 5a is preferred.

In FIGS. 5a and 6 sheet (1) consists of a flexible film having a thickness of about 90 microns and is made from a polyester coated with polyethylene. Sheet (1) is bonded to sheet (2) which is resilient. The latter has a thickness of about 500 microns and it is made from polyvinyl chloride also coated with polyethylene. Sheet (2) is provided with conduits (3 and 4), shoulder portions (8 and 9) and a deformable member (7) having a re-entrant (15) terminating in end (15). The two sheets are generally unbonded between positions (5 and 6). However localized bonding of the sheets is effected at end (15) of the re-entrant (16). Since sheet (2) is resilient there is a tendency for end (15) of the re-entrant to move in the direction A and in doing so to pull sheet (1) to which the end is bonded in the same direction. As a consequence sheet (1) is stretched tightly over shoulder portions (8 and 9) preventing communication between the two conduits (3 and 4). In order to open the valve the deformable member (7) is pressed in the direction B. As a result sheet (1) is lifted off shoulder portions (8 and 9) and communication between the two conduits is established round the base of the now inverted deformable member (7).

The valve can be made by the following sequence of steps, the first of which is to make a container of resilient thermoplastic material by conventional heat moulding techniques except that the mould is shaped so that the container when formed has a flange conforming in shape to sheet (2). The container is then transferred to a lidding machine with the shaped flange (3) positioned above a bottom jig shown in FIG. 5b having a pressure member (19). Sheet material corresponding to sheet (1) is then drawn from a bulk supply (not shown) and laid not only over the open container but also over sheet (2) now shaped to form part of the valve. Sheet (1) extends beneath a heat sealing head (18) which forms part of the lidding machine. The lidding operation involves moving both the container and the heat sealing head downwards. As the sheet (2) contacts the jig (17) pressure member (19) pressess the end of the re-entrant initially into contact with sheet (1) and then both the end and the opposing part of sheet (1) are brought into contact with sealing head (18) where the end of the re-entrant and the contacting part of sheet (1) become fused together. When this stage has been completed the container together with the integral valve is raised from the jig and with the removal of pressure by member (19) the resilient properties of sheet (2) cause sheet (1) to be distorted downwards in the manner described above. During the process the lidding machine seals the container and completes the formation of the valve which sheet material (1).

I claim:

1. A valve comprising a conduit, formed by bonding a first sheet of flexible material to a second sheet of resilient material, one of the sheets being provided with a discrete shoulder extending towards the other sheet, the conduit being closed by reason of the shoulder and the other sheet being normally maintained in close intimate contact, and means to separate the shoulder and the other sheet under resilient deforming pressure whereby to open the conduit, the means to separate maintaining the shoulder and the other sheet apart under resilient deforming pressure while the conduit is open.

2. Valve of claim 1 wherein the second sheet is thicker than the first sheet and possesses spring-like resiliency.

3. Valve of claim 1 wherein the second sheet is provided with the shoulder, and the means to separate is a deformable member formed into the second sheet for separating the shoulder and the first sheet.

4. Valve of claim 3 wherein the second sheet is thicker than the first sheet and possesses spring-like resiliency.

5. Valve of claim 1 wherein the first sheet is made of flexible thermoplastic material and the second sheet is made of resilient thermoplastic material, the second sheet is provided with the shoulder in the form of a shoulder member extending towards the first sheet, and the means to separate is a deformable member provided on the second sheet and positioned adjacent to the shoulder member and being adapted to be deformed towards the first sheet thereby to separate the first sheet from the shoulder member whereby to open the conduit.

6. A container incorporating the valve of claim 1.

7. Container of claim 6 having a lid, the container being made from said sheet of resilient material, the resilient sheet forming one part of the valve, an the lid being made from said sheet of flexible material, the flexible sheet forming the other part of the valve, each of said sheets being a sheet of thermoplastic material.

8. Container of claim 6 having a top and a bottom, and incorporating a conduit which extends from the vicinity of the top of the container to the bottom of the container, the valve being comprised by the conduit.

9. Container of claim 7 having a top and a bottom, and incorporating a conduit which extends from the vicinity of the top of the container to the bottom of the container, the valve being comprised by the conduit.

10. A process of making the container of claim 6 wherein each of said sheets is a sheet of thermoplastic material, comprising applying heat and pressure to said sheet of resilient thermoplastic material with a mold shaped to form a part of the valve in a flange forming part of the container, said part of the valve including said means to separate said means to separate comprising a deformable member, and sealing said sheet of flexible thermoplastic sheet material to the container and in overlying tightly stretched condition to the flange in the vicinity of the deformable member while the flange is maintained stationarily in a mold or jig, for the purpose of closing the container and completing the construction of the valve in the flange.

11. Process of claim 10 wherein during the process the deformable member and the sheet of flexible material are bonded to one another.

12. A process of making the container of claim 7 comprising applying heat and pressure to said sheet of resilient thermoplastic material with a mold shaped to form the one part of the valve in a flange forming part of the container, said one part of the valve including said means to separate said means to separate comprising a deformable member, and sealing said sheet of flexible thermoplastic sheet material to the container and in overlying tightly stretched condition to the flange in the vicinity of the deformable member and in normal sealing contact with the shoulder while the flange is maintained stationarily in a mold or jig, for the purpose of closing the container and completing the construction of the valve in the flange, the sheet of flexible material commonly forming the lid and the other part of the valve.

13. Process of claim 12 wherein during the process the deformable member and the sheet of flexible material are bonded to one another.

14. A valve comprising a conduit, formed by bonding a first sheet of flexible material to a second sheet of resilient material, the second sheet being provided with a shoulder extending towards the first sheet, the conduit being closed by the shoulder and the other sheet being in close intimate contact, and the second sheet being provided with means to separate the shoulder and the first sheet and thereby to open the conduit, the means to separate being a deformable member formed into the second sheet and bonded to the first sheet.

15. Valve of claim 14 wherein the second sheet is thicker than the first sheet and possesses spring-like resiliency.

16. A valve comprising a conduit, formed by bonding a first sheet of flexible material to a second sheet of resilient material, one of the sheets being provided with a discrete shoulder extending towards the other sheet, and such other sheet being under prestressed stretching tension, the conduit being closed by reason of the shoulder and the other sheet being normally maintained in close intimate contact, and means to separate the shoulder and the other sheet whereby to open the conduit, the means to separate being disposed on one to the sheets adjacent to but laterally spaced from the shoulder, and the means to separate being arranged for moving portions of both sheets in the same direction transversely of and away from the shoulder to open the conduit.

* * * * *